United States Patent
Minadeo

(10) Patent No.: US 9,551,324 B2
(45) Date of Patent: Jan. 24, 2017

(54) PITCH BEARING ASSEMBLY WITH STIFFENER

(71) Applicant: General Electric Company, Schenectady, NY (US)

(72) Inventor: Adam Daniel Minadeo, Greenville, SC (US)

(73) Assignee: General Electric Company, Schenectady, NY (US)

( * ) Notice: Subject to any disclaimer, the term of this patent is extended or adjusted under 35 U.S.C. 154(b) by 759 days.

(21) Appl. No.: 13/922,338

(22) Filed: Jun. 20, 2013

(65) Prior Publication Data

US 2014/0377069 A1    Dec. 25, 2014

(51) Int. Cl.
*F03D 11/00* (2006.01)
*F03D 1/06* (2006.01)
*F16C 33/58* (2006.01)
*F16C 33/60* (2006.01)
*F16C 19/18* (2006.01)

(52) U.S. Cl.
CPC ......... *F03D 11/0008* (2013.01); *F03D 1/0658* (2013.01); *F03D 80/70* (2016.05); *F16C 33/586* (2013.01); *F05B 2260/79* (2013.01); *F16C 19/18* (2013.01); *F16C 33/60* (2013.01); *Y02E 10/721* (2013.01); *Y02E 10/722* (2013.01)

(58) Field of Classification Search
CPC .... F03D 11/0008; F03D 1/0658; F03D 80/70; F16C 33/586
See application file for complete search history.

(56) References Cited

U.S. PATENT DOCUMENTS

| | | | |
|---|---|---|---|
| 6,783,326 B2 | 8/2004 | Weitkamp et al. | |
| 6,942,461 B2 | 9/2005 | Wobben | |
| 8,047,792 B2 | 11/2011 | Bech et al. | |
| 8,297,929 B2 | 10/2012 | Steffensen | |
| 8,628,301 B2 * | 1/2014 | Pasquet | F03D 1/0658 416/148 |
| 9,181,982 B2 * | 11/2015 | Lindholst | F03D 11/0008 |
| 2008/0104821 A1 | 5/2008 | Erill et al. | |
| 2008/0191488 A1 | 8/2008 | Kirchner et al. | |
| 2008/0199315 A1 | 8/2008 | Bech | |
| 2008/0213095 A1 | 9/2008 | Bech et al. | |
| 2009/0022442 A1 | 1/2009 | Bech et al. | |
| 2009/0087127 A1 | 4/2009 | Larsen et al. | |
| 2011/0142645 A1 | 6/2011 | Nunez Polo et al. | |
| 2012/0183703 A1 | 7/2012 | Beaulieu | |
| 2012/0263598 A1 | 10/2012 | Thomsen et al. | |

(Continued)

FOREIGN PATENT DOCUMENTS

EP    2 546 512 A1    1/2013

*Primary Examiner* — Craig Kim
*Assistant Examiner* — Jason Fountain
(74) *Attorney, Agent, or Firm* — Dority & Manning, P.A.

(57) ABSTRACT

A pitch bearing assembly for a wind turbine having a stiffener is disclosed. The pitch bearing assembly may include an outer race and an inner race rotatable relative to the outer race. The inner race may define a mounting surface and an inner circumference. The mounting surface may extend generally perpendicular to the inner circumference. In addition, the stiffener may include a body and a mounting flange. The body may extend axially within a volume defined by the inner circumference of the inner race. Further, the mounting flange of the stiffener may be coupled to the mounting surface of the inner race.

18 Claims, 6 Drawing Sheets

(56) References Cited

U.S. PATENT DOCUMENTS

| | | | |
|---|---|---|---|
| 2012/0328443 A1 | 12/2012 | Yegro Segovia et al. | |
| 2013/0177419 A1* | 7/2013 | Zaehr | F03D 7/0224 416/23 |
| 2013/0309069 A1* | 11/2013 | Pandya | F03D 11/0008 415/124.1 |
| 2014/0161614 A1* | 6/2014 | Vervoorn | F03D 7/0224 416/148 |

* cited by examiner

PITCH BEARING ASSEMBLY WITH STIFFENER

FIELD OF THE INVENTION

The present subject matter relates generally to wind turbines and, more particularly, to a pitch bearing assembly for a wind turbine having a stiffener.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy outputs by modifying the size and capacity of wind turbines. One such modification has been to increase the length of the rotor blades. However, as is generally understood, the loading on a rotor blade is a function of blade length, along with wind speed and turbine operating states. Thus, longer rotor blades may be subject to increased loading, particularly when a wind turbine is operating in high-speed wind conditions.

During the operation of a wind turbine, the loads acting on a rotor blade are transmitted through the blade and into the blade root. Thereafter, the loads are transmitted through a pitch bearing disposed at the interface between the rotor blade and the wind turbine hub. Typically, the hub has a much higher stiffness than the rotor blades. Thus, due to the varying (or non-homogeneous) stiffness, the loads are often not evenly distributed around the pitch bearing. As a result, the unequal load distribution may create areas of high loading in the pitch bearing, thereby resulting in higher stress and/or damage to the pitch bearing.

Accordingly, a pitch bearing assembly having a stiffener configured to distribute loads and, thus, reduce the localized stress within the pitch bearing would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a pitch bearing assembly for a wind turbine having a stiffener. The pitch bearing assembly may include an outer race and an inner race rotatable relative to the outer race. The inner race may define a mounting surface and an inner circumference. The inner circumference may define a volume within the inner race. In addition, the mounting surface may be disposed outside the volume defined by the inner circumference. The stiffener may include a mounting flange and a body. The mounting flange of the stiffener may be coupled to the mounting surface of the inner race. Further, the body may extend axially within at least a portion of the volume defined by the inner circumference of the inner race.

In another aspect, another embodiment of a pitch bearing assembly for a wind turbine is disclosed. The pitch bearing assembly includes an outer race, an inner race rotatable relative to the outer race, and a stiffener. The inner race defines a mounting surface and an inner circumference. The inner circumference defines a volume within the inner race. The mounting surface is disposed outside the volume defined by the inner circumference. The stiffener includes a plurality of stiffener segments extending around the inner circumference, each stiffener segment including a body and a mounting flange. The mounting flange is coupled to the mounting surface. The body extends axially within at least a portion of the volume defined by the inner circumference. Further, the stiffener includes a connector segment coupled between two of the plurality of stiffener segments.

In another aspect, the present subject matter is directed to a wind turbine having a hub, a rotor blade, and at least one pitch bearing assembly coupled between the hub and the rotor blade. The pitch bearing assembly may include an outer race and an inner race rotatable relative to the outer race. The inner race may define a mounting surface and an inner circumference. Further, the inner circumference may define a volume within the inner race. The mounting surface may be disposed outside of the volume defined by the inner circumference. In addition, the stiffener may include a body and a mounting flange. The mounting flange of the stiffener may be coupled to the mounting surface of the inner race. Further, the body may extend axially within at least a portion of the volume defined by the inner circumference.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
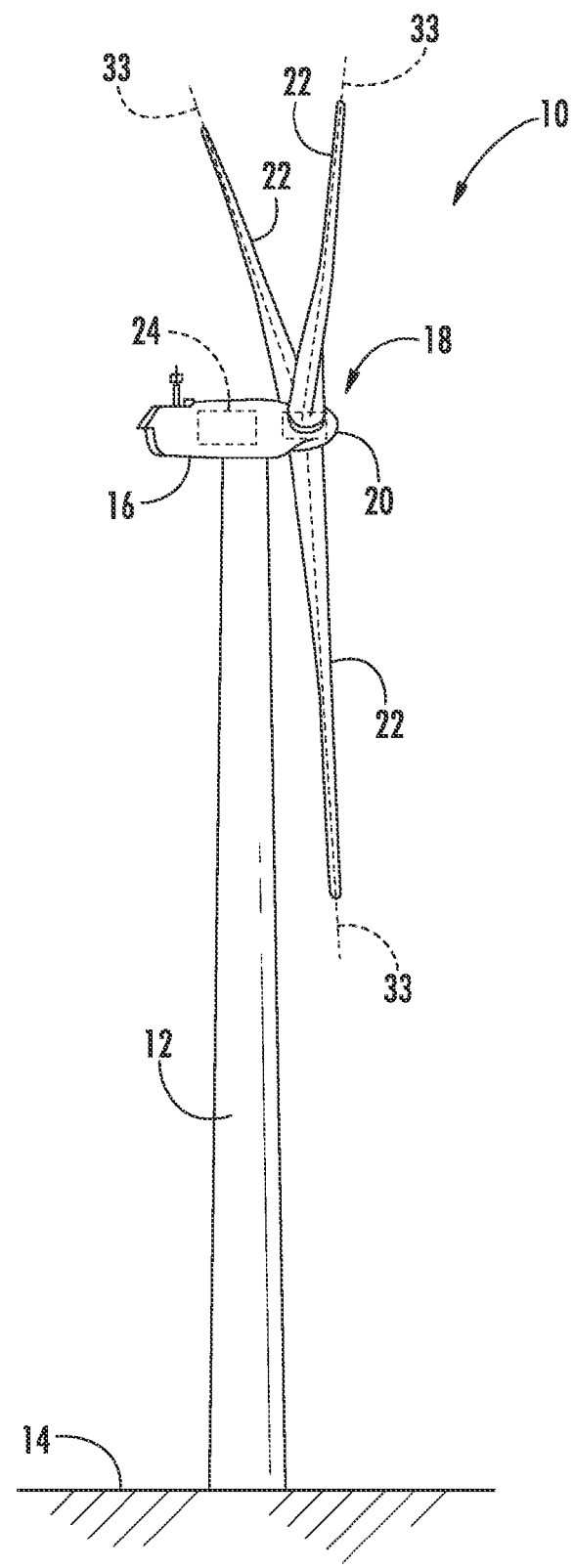
FIG. 1 illustrates a perspective view of one embodiment of a wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a pitch bearing assembly for a wind turbine. The pitch bearing assembly includes an inner race, an outer race, and a stiffener. The stiffener may include a plurality of stiffener segments each having a body and a mounting flange. The mounting flanges may be coupled to a mounting surface of the inner race. The body of each stiffener may extend axially within a volume defined by an inner circumference of the inner race. By providing a segmented stiffener for the pitch bearing as described herein, the stiffener may be installed up a wind turbine tower without the use of costly cranes. Further, the stiffener may provide for a more even load distribution through the rotor blade and the pitch bearing, thereby decreasing the overall stress acting on the pitch bearing.

Referring now to the drawings, FIG. 1 illustrates a side view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Figure 2:
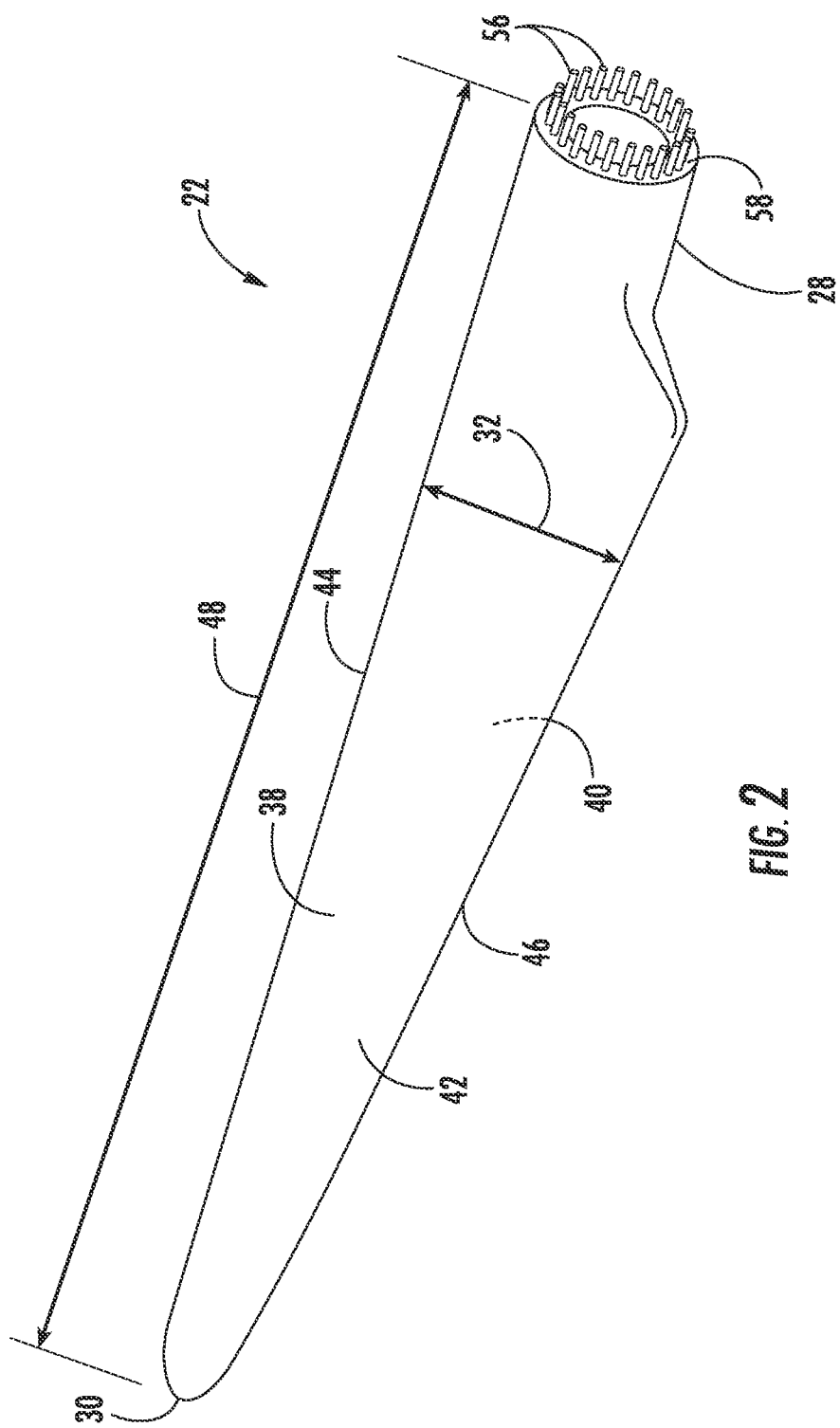
FIG. 2 illustrates a perspective view of one of the rotor blades of the wind turbine shown in FIG. 1.

Referring now to FIG. 2, a perspective view of one of the rotor blades 22 shown in FIG. 1 is illustrated in accordance with aspects of the present subject matter. As shown, the rotor blade 22 includes a blade root 28 configured for mounting the rotor blade 22 to the hub 20 of a wind turbine 10 (FIG. 1) and a blade tip 30 disposed opposite the blade root 28. A body 42 of the rotor blade 22 may extend lengthwise between the blade root 28 and the blade tip 30 and may generally serve as the outer shell of the rotor blade 22. As is generally understood, the body 42 may define an aerodynamic profile (e.g., by defining an airfoil shaped cross-section, such as a symmetrical or cambered airfoil-shaped cross-section) to enable the rotor blade 22 to capture kinetic energy from the wind using known aerodynamic principles. Thus, the body 42 may generally include a pressure side 40 and a suction side 38 extending between a leading edge 44 and a trailing edge 46. Additionally, the rotor blade 22 may have a span 48 defining the total length of the body 42 between the blade root 28 and the blade tip 30 and a chord 32 defining the total length of the body 42 between the leading edge 44 and the trailing edge 46. As is generally understood, the chord 32 may vary in length with respect to the span 48 as the body 42 extends from the blade root 28 to the blade tip 30.

Moreover, as shown, the rotor blade 22 may also include a plurality of bolts 56 for coupling the blade root 28 to the hub 20 of the wind turbine 10. In general, each bolt 56 may be coupled to and extend from blade root 28 so as to project outwardly from a root end 58 of the blade root 28. By projecting outwardly from the root end 58, the root bolts 56 may generally be used to couple the blade root 28 to the hub 20 (e.g., via a pitch bearing 50 (FIG. 3)), as will be described in greater detail below.

Figure 3:
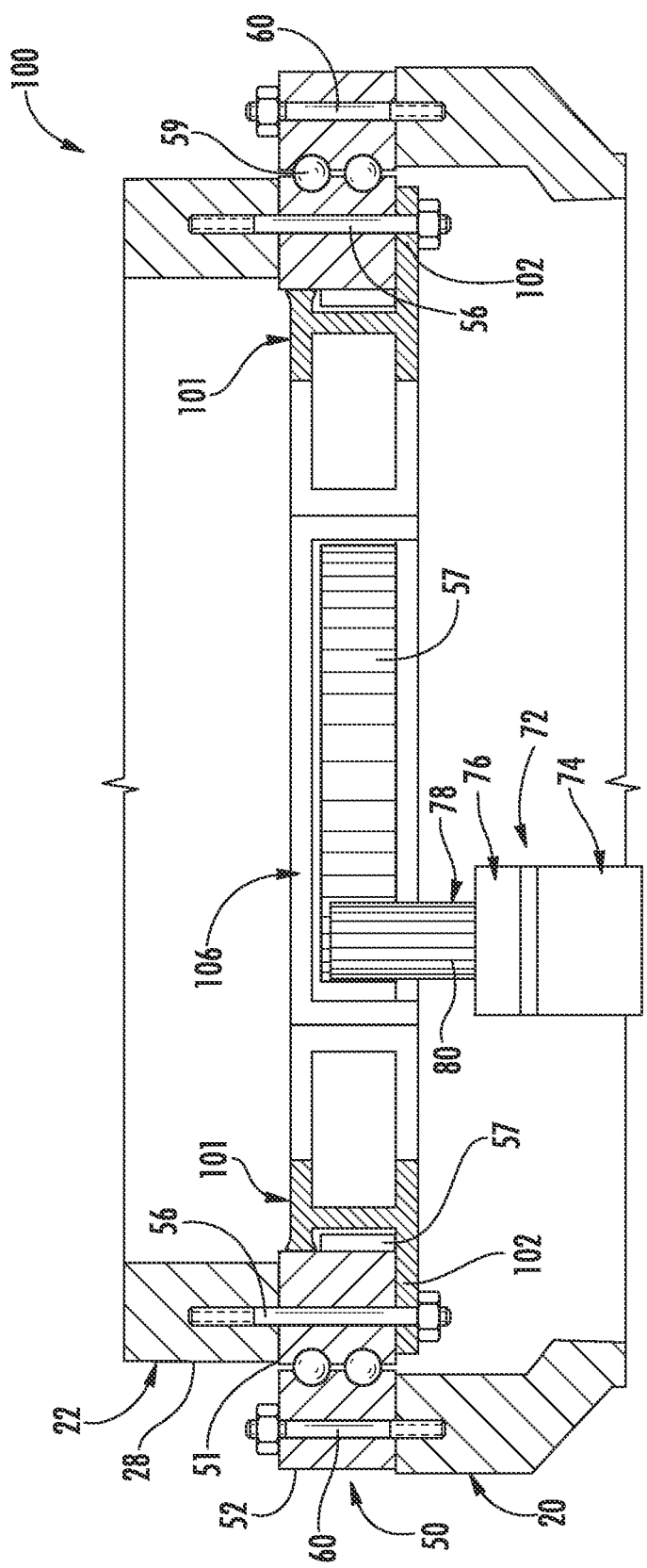
FIG. 3 illustrates a cross-sectional view of one embodiment of a rotor blade coupled to a wind turbine hub via a pitch bearing assembly in accordance with aspects of the present subject matter.
Figure 4:
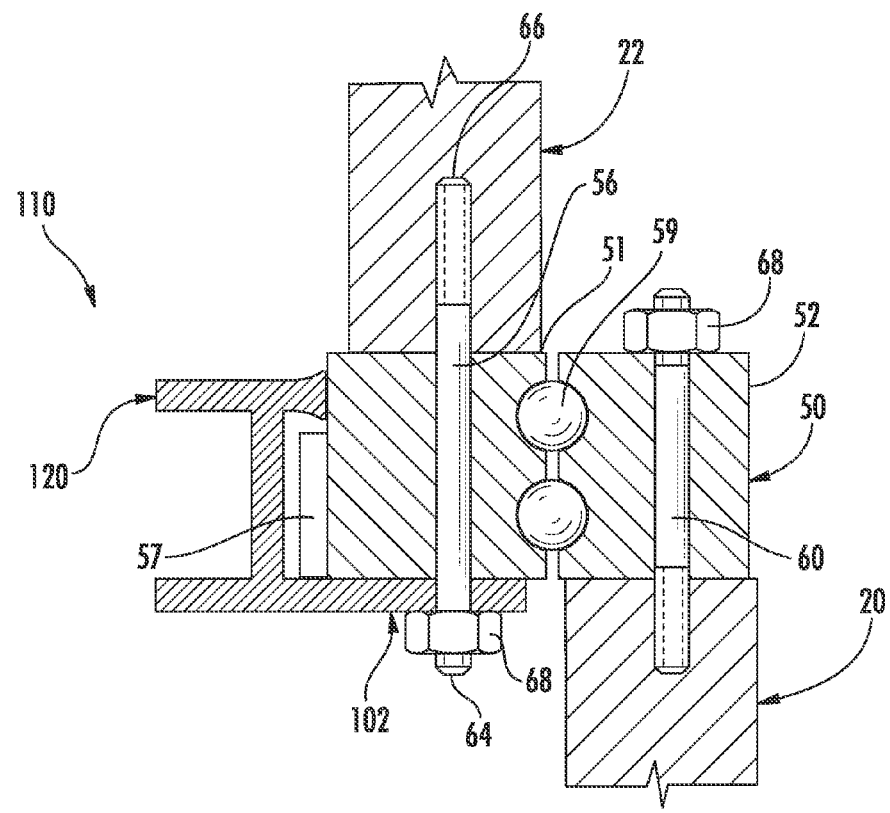
FIG. 4 illustrates a close-up, cross-sectional view of a portion of the pitch bearing assembly as shown in FIG. 3.
Figure 5:
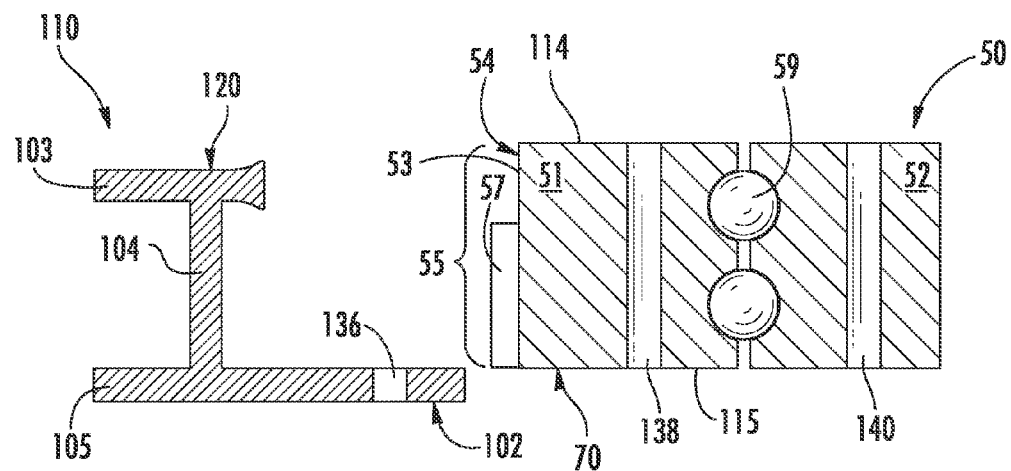
FIG. 5 illustrates a close-up, cross-sectional view of a portion of the pitch bearing assembly in a disassembled state.
Figure 6:
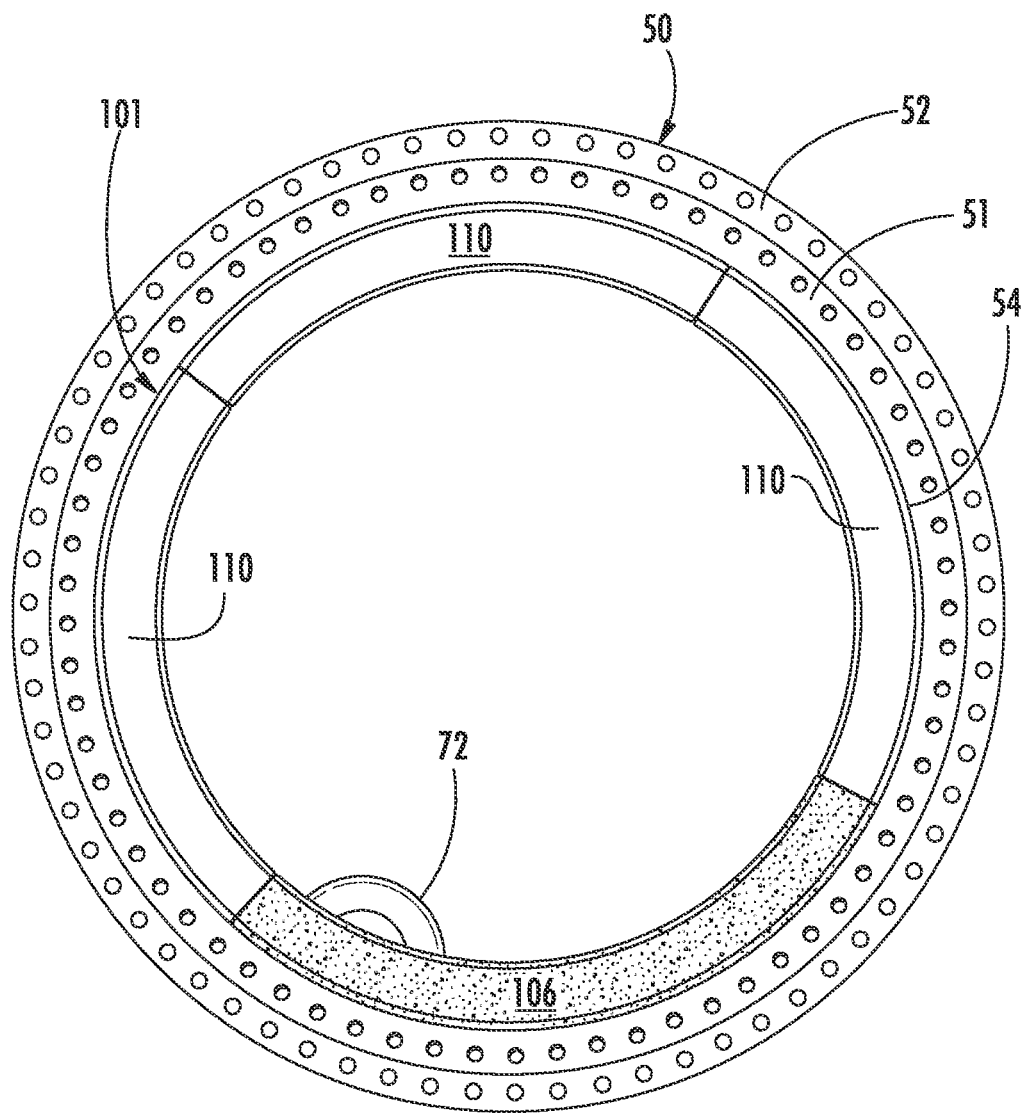
FIG. 6 illustrates a top view of the pitch bearing assembly in accordance with aspects of the present subject matter.
Figure 7:
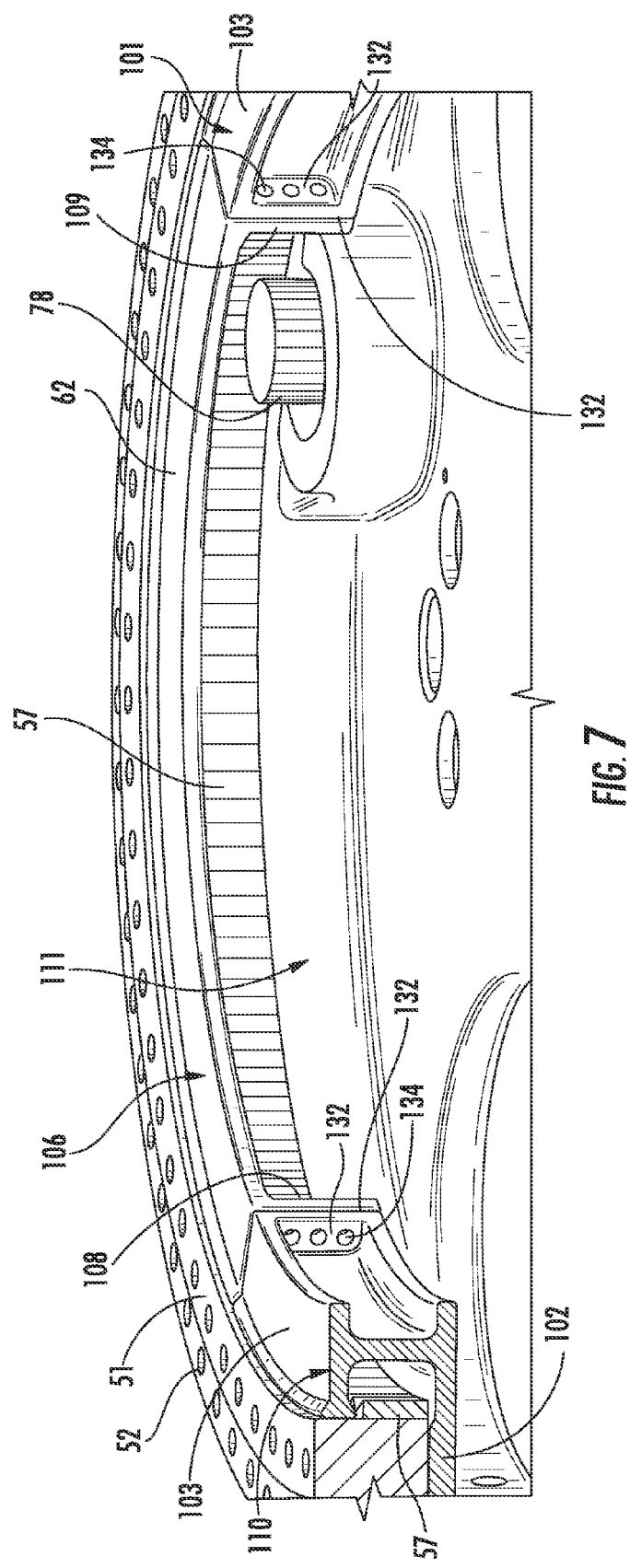
FIG. 7 illustrates a perspective view of the pitch bearing assembly in accordance with aspects of the present subject matter.

Referring now to FIGS. 3-7, several views of a pitch bearing assembly 100 suitable for mounting a rotor blade 22 to the hub 20 of a wind turbine 10 is illustrated in accordance with aspects of the present subject matter. Specifically, FIG. 3 illustrates a partial, cross-sectional view of the rotor blade 22 shown in FIG. 2 mounted onto the hub 20 via a pitch bearing 50 of the pitch bearing assembly 100. FIGS. 4 and 5 illustrate close-up, cross-sectional views of a portion of the rotor blade 22, hub 20, and pitch bearing assembly 100 shown in FIG. 3 in an assembled and disassembled state, respectively. FIG. 6 illustrates a top view of the pitch bearing assembly 100, particularly illustrating a plurality of stiffener segments 110 and a connector segment 106 of a stiffener 101 of the assembly 100. Additionally, FIG. 7 illustrates a perspective view of the pitch bearing assembly 100, particularly illustrating one embodiment of the connector segment 106 shown in FIG. 6.

Referring specifically to FIG. 3, the pitch bearing assembly 100 may generally include a pitch bearing 50 and a stiffener 101 coupled to the pitch bearing 50. In general, the pitch bearing 50 may include an outer bearing race 52, an inner bearing race 51, and a plurality of roller elements (e.g., balls 59) disposed between the outer and inner races 51, 52. As is generally understood, the inner race 51 may be configured to rotate relative to the outer race 52 (via the roller elements 59) to allow the pitch angle of each rotor blade 22 to be adjusted (i.e. to allow the rotor blade 22 to rotate about its pitch axis 33 as shown in FIG. 1). In one embodiment, such relative rotation of the outer and inner races 51, 52 may be achieved using a pitch adjustment mechanism 72 mounted within a portion of the hub 20 (as shown in FIG. 3). In general, the pitch adjustment mechanism 72 may include any suitable components and may have any suitable configuration that allows the mechanism 72 to function as described herein. For example, as shown in the illustrated embodiment, the pitch adjustment mechanism 72 may include a pitch drive motor 74 (e.g., an electric motor), a pitch drive gearbox 76, and a pitch drive pinion 78. In such an embodiment, the pitch drive motor 74 may be coupled to the pitch drive gearbox 76 so that the motor 74 imparts mechanical force to the gearbox 76. Similarly, the gearbox 76 may be coupled to the pitch drive pinion 78 for rotation therewith. The pinion 78 may, in turn, be in rotational engagement with the inner race 51. For example, as shown in FIG. 3, a plurality of gear teeth 57 may be formed along the inner surface 53 of the inner circumference 54, with the gear teeth 57 being configured to mesh with corresponding gear teeth 80 formed on the pinion 78. Thus, due to meshing of the gear teeth 57, 80, rotation of the pitch drive pinion 78 results in rotation of the inner race 51 relative to the outer race 52 and, thus, rotation of the rotor blade 22 about its pitch axis 33 (FIG. 1).

Referring now to FIGS. 3-5, the outer race 52 may generally be configured to be mounted to the hub 20. More specifically, as shown in FIG. 5, the outer race 52 defines a plurality of axial openings 140 configured to receive corresponding hub bolts 60 and/or any other suitable fastening mechanisms. Similarly, the inner race 51 may be configured to be mounted to the blade root 28. For example, the inner race 51 may define a plurality of axial openings 138 configured to receive corresponding root bolts 56 and/or any other suitable fastening mechanisms. As particularly shown in FIG. 4, each root bolt 56 may extend between a first end 64 and a second end 66. The first end 64 of each root bolt 56 may be configured to be coupled to a portion of the inner race 51, such as by coupling the first end 64 to the inner race 51 using an attachment nut 68 and/or other suitable fastening mechanism. Additionally, the second end 66 of each root bolt 56 may extend into and may be secured within an axially extending, threaded opening of a barrel nut (not shown). Alternatively, the second end 66 of each root bolt 56 may simply extend into the blade root 28 and the barrel nut may be absent as shown.

Referring to FIG. 5, the inner race 51 may define a top surface 114, a bottom surface 115, and an inner surface 53 extending perpendicularly between the top and bottom surfaces 114, 115. The inner surface 53 may generally define an inner circumference 54 of the inner race 51. As particularly shown in FIG. 5, the inner circumference 54 may define an open volume 55 within the inner race 51 that extends between the horizontal planes defined by the top and bottom surface 114, 115 of the inner race 51. Additionally, as indicated above, a plurality of gear teeth 57 may be defined around the inner circumference 54 of the inner race 51. As shown in the illustrated embodiment, the gear teeth 57 may be configured to extend height-wise along the inner circumference 54 only partially between the top and bottom surfaces 114, 115 of the inner race 51. Alternatively, the gear teeth 57 may be configured to extend height-wise fully between the top and bottom surfaces 114, 115.

Moreover, in several embodiments, the inner race 51 may include a mounting surface 70 disposed outside the open volume 55 defined by the inner circumference 54. For example, as shown in the illustrated embodiment, the mounting surface 70 may correspond to the bottom surface 115 of the inner race 51 and, thus, may be configured to extend generally perpendicular to the inner surface 53 of the inner race 51. Alternatively, the mounting surface 70 may correspond to the top surface 114 of the inner race 51 or any other suitable surface of the inner race 51.

Referring still to FIG. 5, the stiffener 101 of the pitch bearing assembly 100 may generally comprise a structural member of the assembly 100 configured to provide additional stiffness and/or rigidity to the pitch bearing 50 at the bearing/blade interface. For example, in several embodiments, the stiffener 101 may correspond to a stiffening ring configured to extend around the inner circumference 54 of the inner race 51. In such embodiments, the stiffener 101 may be formed as a single-piece continuous ring or a segmented ring. For instance, in the illustrated embodiment, the stiffener 101 is formed from a plurality of segments 110 configured to be coupled to one another around the inner circumference 54 to as to form a ring-like shape. Specifically, as shown in FIG. 6, the stiffener 101 may include three stiffener segments 110 and a connector segment 106 coupled between adjacent stiffener segments 110. However, in alternative embodiments, the stiffener 101 may include any other suitable number of segments 110. It should be appreciated that such a segmented configuration may allow for the stiffener 101 to be easily installed up-tower without the use of costly cranes.

Referring back to FIGS. 4 and 5, each stiffener segment 110 may include a body 120 and a mounting flange 102. The body 120 may generally be configured to extend axially within at least a portion of the open volume 55 defined by the inner circumference 54 of the inner race 51 when the stiffener segment 110 is coupled to the pitch bearing 50. For example, in several embodiments, the body 120 may be configured to extend through the entire volume 55 or only a portion of volume 55 defined within the inner race 51.

As best shown in FIG. 5, the body 120 of each stiffener segment 110 may include a top portion 103, a bottom portion 105, and a web 104 extending between the top and bottom portions 103, 105. In general, the top portion 103, the bottom portion 105 and/or the web 104 may be configured to have any suitable configuration that allows the stiffener 101 to provide additional stiffness and/or rigidity to the inner race 51 of the pitch bearing 50 at and/or adjacent to the blade/bearing interface. For instance, in several embodiments, the web 104 may be configured to extend perpendicularly between the top and bottom portions 103, 105 so as to define an "I" shape. In other embodiments, the body 120 may be configured to define any other suitable shape. Additionally, in several embodiments, at least a portion of the body 120 may be configured to contact the inner surface 53 of the inner race 51 when the stiffener segment 110 is coupled to the pitch bearing 50. For example, as shown in FIG. 4, the top portion 103 may be configured to contact the inner surface 53 above the gear teeth 57. Moreover, as shown in FIG. 4, the body 120 may be configured such that the web 104 is spaced apart radially from the gear teeth 57. Alternatively, the web 104 may be disposed directly adjacent to and/or against the gear teeth 57.

Still referring to FIGS. 4 and 5, the mounting flange 102 may be configured to be coupled to the mounting surface 70 of the inner race 51. For example, the mounting flange 102 may include one or more axially oriented stiffener openings 136 configured to be aligned with the axial opening(s) 138 defined in the inner race 51. As such, when the mounting flange 102 is appropriately positioned relative to the mounting surface 70, the root bolts 56 may be inserted through the aligned openings 136, 138, thereby allowing such bolts 56 to be utilized to couple both the stiffener 101 and the blade root 28 to the inner race 51. In alternative embodiments, the mounting flange 102 of the stiffener 101 may be coupled to the inner race 51 using separate fasteners or using any other suitable attachment means, such as welding or adhesives.

It should be appreciated that, in several embodiments, the mounting flange 102 may be formed integrally with the body 120, such as by forming the mounting flange 102 integrally with the bottom portion 105 of the body 120. Alternatively, the mounting flange 102 may be configured to be separately attached to the body 120, such as by welding or bolting the mounting flange 102 onto the bottom portion 105 of the body 120.

Referring now to FIGS. 6 and 7, as indicated above, the connector segment 106 of the stiffener 101 may be configured to be coupled between two of the stiffener segments 110. In general, the connector segment 106 may be configured to allow the drive pinion of the pitch adjustment mechanism 72 to engage the gear teeth 57 defined around the inner circumference 54 of the inner race 51. For example, in several embodiments, the connector segment 106 may include a connector portion 62 extending between a first end 108 and a second end 109. As shown in FIG. 7, the connector portion 62 may generally be aligned with the top portion 103 of each stiffener segment 110 such that the connector portion 62 is disposed axially above the gear teeth 57. As such, an open volume 111 may be defined below the connector portion 62 (and between the first and second ends 108, 109) to allow the drive pinion to engage the gear teeth 57. In such an embodiment, the dimensions of the connector portion 62 may be selected such that the open volume 110 defined between the first and second ends 108, 109 is sufficient to allow a full range of pitch motion for the rotor blade 22 (i.e., by allowing the rotor blade 22 to be pitched between the feather and power positions). For example, the connector portion 62 may be configured such that the open volume 111 defines a circumferential length having an angle defined from the center of the pitch bearing 50 of at least 90 degrees, as 90 degrees is the traditional full range of motion of the pitch bearing 50.

It should be appreciated that the various segments 106, 110 of the stiffener 101 may be configured to be coupled to another around the inner circumference 54 of the inner race 51 using any suitable means/method known in the art. For example, as shown in FIG. 7, each segment 106, 110 may include a flange 132 located at each of its ends that defines a plurality of connector holes 134 for connecting such segment to adjacent segments. In such an embodiment, suitable fasteners (not shown) may be inserted through the aligned holes 134 of adjacent flanges 132 to couple the segments 106, 110 together around the inner circumference 54. Alternatively, the segments 106, 110 may be coupled to one another using any other suitable means known in the art, such as by welding the segments together.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A pitch bearing assembly for a wind turbine, comprising;
   an outer race;
   an inner race adjacent to the outer race, the inner race rotatable relative to the outer race via a plurality of roller elements, the inner race defining a mounting surface and an inner circumference, the inner circumference defining an open volume within the inner race, the mounting surface being disposed outside the volume defined by the inner circumference; and
   a stiffener including a mounting flange and a body, the mounting flange being coupled to the mounting surface, the body extending axially within a portion of the open volume defined by the inner circumference, the stiffener having an arcuate ring shape that corresponds to the inner circumference of the inner race, the arcuate ring shape of the stiffener defining an open center; wherein the body includes a top portion, a bottom portion, and a web extending between the top and bottom portions; wherein the web extends perpendicularly between the top and bottom portions so as to define an "I" shape.

2. The pitch bearing assembly of claim 1, wherein the mounting surface corresponds to a bottom surface of the inner race.

3. The pitch bearing assembly of claim 1, wherein the mounting flange is formed integrally with the bottom portion.

4. The pitch bearing assembly of claim 1, wherein the top portion is configured to contact an inner surface of the inner race.

5. The pitch bearing assembly of claim 1, wherein a plurality of gear teeth are formed around the inner circumference of the inner race, the web being spaced apart radially from the gear teeth.

6. The pitch bearing assembly of claim 1, wherein the stiffener is formed from a plurality of stiffener segments, the stiffener segments configured to be coupled to one another around the inner circumference of the inner race.

7. The pitch bearing assembly of claim 6, further comprising a connector segment extending between a first end and a second end, the first end being configured to be coupled to one of the plurality of stiffener segments and the second end being configured to be coupled to another of the plurality of stiffener segments.

8. The pitch bearing assembly of claim 7, wherein the connector segment defines an open volume between the first and second ends configured to receive a pitch drive pinion of the wind turbine.

9. The pitch bearing assembly of claim 1, wherein the stiffener forms a ring around the inner circumference of the inner race.

10. The pitch bearing assembly of claim 1, wherein the mounting surface extends generally perpendicular to the inner circumference of the inner race.

11. A pitch bearing assembly for a wind turbine, comprising:
    an outer race;
    an inner race adjacent to the outer race, the inner race rotatable relative to the outer race via a plurality of roller elements, the inner race defining a mounting surface and an inner circumference, the inner circumference comprising a plurality of gear teeth and defining an open volume within the inner race, the mounting surface being disposed outside the volume defined by the inner circumference; and
    a stiffener including a plurality of arcuate stiffener segments extending circumferentially around the inner circumference, each stiffener segment including a body and a mounting flange, the mounting flanges being coupled to the mounting surface, each body extending axially within a portion of the open volume defined by the inner circumference, the stiffener further comprising a connector segment coupled between two of the plurality of stiffener segments, the connector segment a first end, a second end, and a connector portion therebetween, the connector portion disposed axially above the gear teeth so as to define an open volume below the connector portion.

12. A wind turbine, comprising
    a hub;
    a rotor blade extending from the hub; and
    a pitch bearing assembly coupled between the hub and the rotor blade, the pitch bearing assembly comprising:
      an outer race;
      an inner race adjacent to the outer race, the inner ace rotatable relative to the outer race via a plurality of roller elements, the inner race defining a mounting surface and an inner circumference, the inner circumference defining an open volume within the inner race, the mounting surface being disposed outside the volume defined by the inner circumference; and
      a stiffener including a mounting flange and a body, the mounting flange being coupled to the mounting surface, the body extending axially within at least a portion of the open volume defined by the inner circumference, the stiffener having an arcuate ring shape that corresponds to the inner circumference of the inner race, the arcuate ring shape of the stiffener defining an open center; wherein the body includes a top portion, a bottom portion, and a web extending between the top and bottom portions; wherein the web extends perpendicularly between the top and bottom portions so as to define an "I" shape.

13. The wind turbine of claim 12, wherein the mounting surface corresponds to a bottom surface of the inner race.

14. The wind turbine of claim 12, wherein the body portion includes a top portion, a bottom portion and a web extending between the top and bottom portions.

15. The pitch bearing assembly of claim 14, wherein the top portion is configured to contact an inner surface of the inner race.

16. The pitch bearing assembly of claim 14, wherein a plurality of gear teeth are formed around the inner circumference of the inner race, the web being spaced apart radially from the gear teeth.

17. The pitch bearing assembly of claim 12, wherein the stiffener is formed from a plurality of stiffener segments, the stiffener segments configured to be coupled to one another around the inner circumference of the inner race.

18. The pitch bearing assembly of claim 17, further comprising a connector segment extending between a first end a second end, and a connector segment extending therebetween, the first end being configured to be coupled to one of the plurality of stiffener segments and the second end being configured to be coupled to another of the plurality of stiffener segments, the connector portion disposed axially above the gear teeth so as to define an open volume below the connector portion.

* * * * *